United States Patent
Adler et al.

(10) Patent No.: US 7,414,580 B2
(45) Date of Patent: Aug. 19, 2008

(54) METHOD AND CORRESPONDING DEVICE FOR JOINT SIGNAL DETECTION AND DIRECTION OF ARRIVAL ESTIMATION

(75) Inventors: Amir Adler, Zichron Yaakov (IL); Aviv Salamon, Ra'anana (IL); Moshe Salhov, Herzelia (IL)

(73) Assignee: Go Networks, Inc., Mountain View, CA (US)

( * ) Notice: Subject to any disclaimer, the term of this patent is extended or adjusted under 35 U.S.C. 154(b) by 377 days.

(21) Appl. No.: 11/148,292

(22) Filed: Jun. 9, 2005

(65) Prior Publication Data

US 2006/0279462 A1 Dec. 14, 2006

(51) Int. Cl.
*G01S 5/02* (2006.01)
(52) U.S. Cl. .................. 342/417; 342/372; 342/442
(58) Field of Classification Search .............. 342/368, 342/372, 374, 417, 442–444
See application file for complete search history.

(56) References Cited

U.S. PATENT DOCUMENTS

| | | | |
|---|---|---|---|
| 6,347,234 B1 | 2/2002 | Scherzer | |
| 6,463,303 B1* | 10/2002 | Zhao | 455/562.1 |
| 6,489,923 B1 | 12/2002 | Bevan | |
| 2003/0114193 A1* | 6/2003 | Kavak et al. | 455/562 |
| 2004/0176137 A1* | 9/2004 | Doi | 455/562.1 |

* cited by examiner

*Primary Examiner*—Dao L Phan
(74) *Attorney, Agent, or Firm*—Morrison & Foerster LLP

(57) ABSTRACT

A method and corresponding device for joint signal detection and direction of arrival estimation, based on the ability to identify both the existence and direction of arrival of a required signal featuring known characteristics, before it is forwarded to a modem. Optionally, after identifying the existence and direction of arrival of a required signal, the direction of arrival is entered into a beamformer featuring high resolution, for obtaining the signal coming from the required direction of arrival. The calculated signal is then entered into a modem.

51 Claims, 3 Drawing Sheets

METHOD AND CORRESPONDING DEVICE FOR JOINT SIGNAL DETECTION AND DIRECTION OF ARRIVAL ESTIMATION

FIELD AND BACKGROUND OF THE INVENTION

The present invention relates to signals detection used in receivers and, more particularly, to methods and corresponding devices for joint signal detection and direction of arrival estimation, based on the ability to identify both the existence and direction of arrival of a required signal featuring known characteristics, before it is forwarded to a modem. Optionally, after identifying the existence and the direction of arrival of a required signal, the direction of arrival is entered into a beamformer to obtain the signal coming from the required direction of arrival. The calculated signal is then entered into a modem.

Basic principles and details relating to joint signal detection and direction of arrival estimation needed for properly understanding the present invention are provided herein. Complete theoretical descriptions, details, explanations, examples, and applications of these and related subjects and implementations are readily available in standard references from the fields of telecommunication, signals detection and, spatial scanning.

Prior art includes various teachings of signal characteristics detection. In U.S. Pat. No. 6,347,234, issued to Scherzer, there is disclosed a method of enhancing signal quality (carrier to interference) in both up and downlink of wireless point to multi-point CDMA service implements basic radio direction finding techniques to allow for optimal diversity combining in an antenna array employing large number of elements. This prior art is implemented through the use of very small bit counts arithmetic and capitalizing on finite alphabet signal structure or a known training sequence. Alternate implementations can use floating point data representations. The method facilitates ASIC implementation, thereby enabling distributed processing to achieve the required computation practicality. The method utilizes the uplink channel data to determine the downlink spatial structure (array beams) to enhance downlink carrier to interference and hence, increase downlink capacity.

However, Scherzer is notably limited because it describes a specific CDMA implementation that can not be used for other types of signals. Additionally, the disclosed method is particularly described with respect to channel estimation featuring channel estimators, and is not obviously extendable to estimating the characteristics of the received signals.

In U.S. Pat. No. 6,489,923, issued to Bevan et al. there is disclosed a mechanical system for position location for a mobile telecommunications system by estimating its bearing and range from a cell site. A multi-element direction finding antenna at the cell site receives signals from the mobile station and a receiver circuit estimates the bearing using the relative phase of signals received at different antenna elements and estimates the range by measuring round trip delay of signals to and from the mobile station. Motion of the mobile station can introduce errors into the bearing estimate due to frequency offset and frequency spread when element sampling is non-simultaneous. Compensation for these errors is introduced by using signal samples successively received at the same antenna element to estimate Doppler frequency offset and spread. It is necessary to ensure accurate calibration of the direction finding antenna and the receiver circuit. This is done by injecting calibration signals into the circuit near the antenna or into the antenna itself from a near field probe. Other aspects of calibration, such as antenna position, are calibrated using a remote beacon. A beacon emulating a mobile station but at a fixed, known location, or a beacon at an adjacent cell site may be used.

However, Benav et al. disclose a mechanical system and cells fragmentation. There is no description or suggestion for antenna array with no moving parts. Moreover, Bevan et al. provide no description or suggestion relating to joint signal detection and direction of arrival estimation.

Other prior art solutions are analog solutions in RF. Implementation of analog systems requires putting a modem on each beam. However, this solution is highly expensive, which is why current analog solutions do not provide the novel functionality of the present invention.

To date, the inventor is unaware of prior art teaching of a digital solution for joint signal detection and direction of arrival estimation, before the signal is forwarded to a modem.

There is thus a need for, and it would be highly advantageous and useful to have a method and corresponding device for joint signal detection and direction of arrival estimation, based on the ability to identify both the existence and direction of arrival of a required signal featuring known characteristics, before it is forwarded to a modem. Moreover, there is a need for such a method, which is significantly simpler, more rapid, and therefore, more cost effective, than currently used techniques for signal detection and direction of arrival estimation.

To one of ordinary skill in the art, there is thus a need for identifying required signals using inexpensive hardware. As a result, there is a need to identify required signals without using a huge number of calculations. Using a correlator in the time domain to identify required signals requires a huge number of calculations, and therefore is expensive.

Furthermore, most communication standards contain a transmission power limit. Increasing the gain of a transmitting antenna decreases the transmission power. Therefore, there is thus a need for, and it would be highly advantageous to have a method and corresponding device that increase transmission and reception ranges without increasing the antenna's gain.

One of the possible solutions for increasing the transmission and reception ranges without increasing the antenna's gain is to use the spatial scanning method, as known in the radar art. However, the spatial scanning method is notably limited because it is time-consuming.

It is also desirable to have a method and device for sniffing the medium in order to filter out interfering signals. In an exemplary embodiment of the present invention, an IEEE 802.11 type of wireless network is implemented. In this exemplary embodiment, interfering signals that should be filtered out are, for example, Bluetooth signals, Cordless phones signals, etc.

SUMMARY OF THE INVENTION

The present invention relates to signals detection used in receivers and, more particularly, to methods and corresponding devices for joint signal detection and direction of arrival estimation, based on the ability to identify both the existence and direction of arrival of a required signal featuring known characteristics, before it is forwarded to a modem. Optionally, after identifying the existence and the direction of arrival of a required signal, the direction of arrival is entered into a beamformer to obtain the signal coming from the required direction of arrival. The calculated signal is then entered into a modem.

Thus, according to the present invention, there is provided methods and corresponding devices for joint signal detection and direction of arrival estimation, based on the ability to identify both the existence and direction of arrival of a required signal featuring known characteristics, before it is forwarded to a modem, featuring a method for signals detection comprising: (a) receiving at least two input signals from an antenna array, (b) extracting signals received from at least one predefined direction, (c) checking whether it is likely that a required signal is received by the antenna array, (d) identifying and extracting potentially required signal, (e) forwarding the identified potentially required signal to a modem.

According to another aspect of the present invention, there is provided a device for joint signal detection and direction of arrival estimation comprising: (a) an antenna array, (b) at least one beamformer, (c) at least one signal characteristics detector for checking whether it is likely that at least one required signal is received by the antenna array, (d) at least one characteristics identifier, wherein the characteristics identifier is identifying a potentially required signal featuring predefined characteristics, (e) a controller, wherein the controller is forwarding the identified potentially required signals to a modem.

According to still another aspect of the present invention, there is provided a method for signals detection comprising: (a) receiving at least two input signals from an antenna array, (b) correlating the at least two input signals with at least one predefined correlation pattern, (c) beamforming the correlated signals from each one of the at least one predefined correlation pattern, (d) correlation detecting and direction of arrival estimating for identifying potentially required signal, (e) forwarding the identified potentially required signal to a modem.

According to still another aspect of the present invention, there is provided a device for joint signal detection and direction of arrival estimation comprising: (a) an antenna array, (b) at least one correlator featuring a predefined pattern, (c) at least one beamformer, (d) at least one signal characteristics detector for checking whether it is likely that at least one required signal is received by the antenna array, (e) at least one characteristics identifier, wherein the characteristics identifier is identifying potentially required signal featuring predefined characteristics, (f) at least one controller, wherein the at least one controller is forwarding the identified potentially required signal to a modem.

The present invention successfully addresses shortcomings and limitations of presently known methods for signal detection and direction of arrival estimation, by being simpler, more rapid, and therefore, more cost effective, than currently used techniques for signal detection and direction of arrival estimation. The method of the present invention is readily implemented using standard hardware. Moreover, the method of the present invention is generally applicable as a 'stand-alone' joint signal detection and direction of arrival estimation tool, or, as a joint signal detection and direction of arrival estimation tool used in combination with other telecommunication devices and systems.

Implementation of the method and corresponding device of the present invention involves performing or completing selected tasks or steps manually, semi-automatically, fully automatically, and/or, a combination thereof. Moreover, according to actual instrumentation and/or equipment used for implementing a particular preferred embodiment of the disclosed method and corresponding device, several selected steps of the present invention could be performed by hardware, by software on any operating system of any firmware, or a combination thereof. In particular, regarding hardware, selected steps of the invention could be performed by a computerized network, a computer, a computer chip, an electronic circuit, hard-wired circuitry, or a combination thereof, involving a plurality of digital and/or analog, electrical and/or electronic, components, operations, and protocols. Additionally, or alternatively, regarding software, selected steps of the invention could be performed by a data processor, such as a computing platform executing a plurality of computer program types of software instructions or protocols using any suitable computer operating system.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented for the purpose of providing what is believed to be the most useful and readily understood description of the principles and conceptual aspects of the present invention. In this regard, no attempt is made to show structural details of the present invention in more detail than is necessary for a fundamental understanding of the invention. Moreover, the description taken with the drawings making apparent to those skilled in the art how the several forms of the invention may be embodied in practice. Identical structures, elements or parts that appear in more than one figure preferably are labeled with a same or similar number in all the figures in which they appear. In the drawings.

DESCRIPTION OF THE PREFERRED EMBODIMENTS

Figure 1:
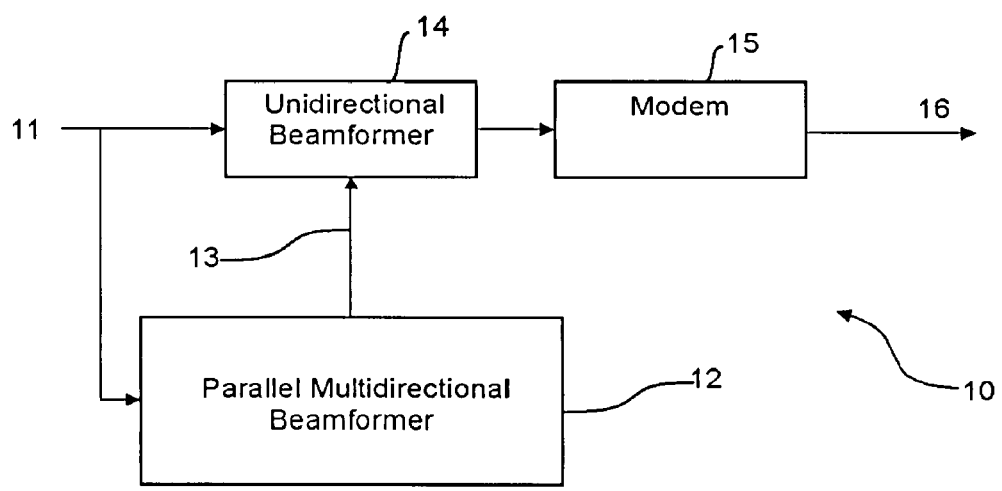
FIG. 1 is a schematic diagram illustrating an exemplary preferred embodiment of the system for joint signal detection and direction of arrival estimation, in accordance with the present invention.

The present invention relates to signals detection used in receivers and, more particularly, to methods and corresponding devices for joint signal detection and direction of arrival estimation, based on the ability to identify both the existence and direction of arrival of a required signal featuring known characteristics, before it is forwarded to a modem. Optionally, after identifying the existence and the direction of arrival of a required signal, the direction of arrival is entered into a beamformer to obtain the signal coming from the required direction of arrival. The calculated signal is then entered into a modem.

The present invention features a non-obvious method and corresponding device that calculate in parallel the Automatic Gain Control (AGC) and the direction of the signal. This is in strong contrast to prior art methods and devices featuring separate AGC and direction-finding.

Another non-obvious feature of the present invention is that the Multi-Path problem also is reduced by using digitally synthesized directional beams.

Another non-obvious feature of the present invention is the implementation of characteristics detection of both the signal and signal's direction of arrival estimation with interference avoidance. This is useful for applications having to detect signals with known characteristics.

Another novel feature is that the present invention is highly useful for applications using an antenna array, which have to locate the existence of specific signals in an environment characterized by high noise and interfering signals.

The present invention is highly useful when searching for a known signal in a wide spectral interval or when searching for a specific user by listening to the media. For example, military and police forces search for users who are transmitting from a certain type of communications equipment having known characteristics. This is in strong contrast to existing systems that detect all signals existing in the medium. According to the present invention, illegal signals are filtered before they are forwarded to the modem, thus drastically reducing the number of calculations the modem is required to perform. According to the present invention, the modem detects only signals that have the required predefined characteristics, and it does not have to detect all received signals.

In an exemplary embodiment of the present invention, the system of the present invention implements an 802.11 type protocol. In this case, another unique feature of the present invention is that the existence of interfering signals almost does not reduce the throughput of the system, due to the fact that most interfering signals are not forwarded to the modem. This is in strong contrast to prior art solutions where the modem is detecting interfering signals, and therefore the throughput of the system is reduced because the 802.11 MAC is increasing the backoff intervals. The 802.11 MAC increases the backoff intervals because it assumes that the medium is occupied by other users, and therefore is waiting.

The present invention discloses methods and corresponding devices for joint signal detection and direction of arrival estimation, based on its ability to identify both the existence and direction of arrival of a required signal featuring known characteristics. The preferred embodiments of the present invention are discussed in detail below. It is to be understood that the present invention is not limited in its application to the details of the order or sequence of steps of operation or implementation of the method, and to the details of construction, arrangement, and, composition of the components of the device, set forth in the following description, drawings, or examples. While specific steps, configurations and arrangements are discussed, it is to be understood that this is done for illustrative purposes only. A person skilled in the relevant art will recognize that other steps, configurations and arrangements can be used without departing from the spirit and scope of the present invention.

Moreover, the methods and corresponding devices of the present invention can be implemented in a variety of configurations, for example, a variety of communication standards, and encompass a wide range of interferential and environmental conditions.

Additionally, for better understanding the overall general methods and corresponding devices of the present invention, the description provided herein details a serial mode of implementation for joint signal detection and direction of arrival estimation; however, it is to be clearly understood that the overall general method of the present invention is applicable to a parallel mode of implementation.

The present invention is capable of other embodiments or of being either practiced or carried out in various ways. Also, it is to be understood that the phraseology, terminology, and, notation, employed herein are for the purpose of description and should not be regarded as limiting.

In the following description of the method and corresponding device of the present invention, included are only main or principal steps needed for sufficiently understanding proper 'enabling' utilization and implementation of the disclosed methods and corresponding devices for joint signal detection and direction of arrival estimation. Accordingly, descriptions of the various required or optional minor, intermediate, and/ or, sub steps, which are readily known by one of ordinary skill in the art, and/or, which are available in the prior art and technical literature relating to signal processing, are not included herein.

Steps, components, operation, and implementation of joint signal detection and direction of arrival estimation according to the present invention are better understood with reference to the following description and accompanying drawings.

Referring now to the drawings, FIG. 1 is a schematic illustration of the preferred embodiment of the system of the present invention, generally referred to as system 10, in relation to other objects and features, for joint signal detection and direction of arrival estimation, in accordance with the present invention. System 10 features the following primary components: multi-base-band inputs 11, parallel multidirectional beamformer 12, unidirectional beamformer 14, modem 15, and optional data output 16. It is to be understood that all the above-described components are only a schematic illustration of the components of the present invention. For example, the components of the present invention may be connected to each base-band input or to pre-selected inputs, i.e. devices 12 and 14 may be applied to all or some of the base-band inputs 11. Each primary component, and additional components needed for enabling the use of System 10 are described in the following detailed description of the method of the present invention.

There is Receiving at Least Two Input Signals from an Antenna Array.

The antenna of the present invention is an antenna array featuring at least two elements.

In an exemplary embodiment of the present invention, there is receiving at least two base-band input signals from an antenna's elements. In an exemplary embodiment of the present invention, the elements feature the same weights, for example, a weight equal to one, i.e. no weight.

It is to be understood that the input signals are processed in the digital domain, after down conversion from RF to base-band frequency, filtering, and sampling by analog to digital device. Referring to FIG. 1, according to an exemplary embodiment, the at least two input signals are receiving as at least two base-band inputs 11 processed in the digital domain.

There is Extracting the Signals Received from at Least One Predefined Direction.

In an exemplary embodiment of the present invention, beamforming is achieved by multiplying the received input signals in predefined weightings.

Referring to FIG. 1, extracting the signals received from at least one predefined direction is implemented on device 12. Referring to device 12, in an exemplary embodiment of the present invention, the beamforming to all predefined directions is implemented in parallel.

Optionally, the weightings in device 12 are implemented by using IFFT as known in the art.

Optionally, the beamforming in device 12 is achieved by matrix vector multiplication, as known in the art.

In an exemplary embodiment of the present invention, the multi-directional parallel beamformer 12 is optionally calculated in short word length, (i.e. low resolution or low dynamic range) in order to reduce hardware requirements. The short word length should be selected in such a way that it is enough for checking whether it is likely that at least one required signal is received by the antenna array.

There is Checking whether it is Likely that at Least One Required Signal is Received by the Antenna Array.

In an exemplary embodiment of the present invention, checking whether it is likely that at least one required signal is received by the antenna array is performed by correlating the signals received from at least one predefined direction with a predefined correlation pattern. Exemplary predefined correlation patterns are a training sequence or preamble. Optionally, when the signal features a repetitive pattern, this step can be done using Autocorrelation.

According to an alternative embodiment of the present invention, there is detecting the power of the input signal instead of correlating the signal. Power detection is less accurate than correlation, but also less expensive.

According to another alternative embodiment of the present invention, there is spatial power detection of the input signal. Signals featuring spatial power bigger than a predefined threshold are forwarded to correlators. This alternative embodiment features fewer correlators than the previous embodiments, but increases the calculation time and sensitivity to interference.

According to another alternative embodiment of the present invention, there is correlating only one signal received from only one antenna by using a predefined correlation pattern. The correlation result is than power-detected. Whenever the power exceeds a predefined threshold, it is likely that a required signal is received by the antenna. This alternative embodiment uses only one correlator.

Referring to FIG. 1, checking whether it is likely that at least one required signal is received by the antenna array is implemented in device 12.

In another exemplary embodiment of the present invention, there is first correlating the inputs, using at least one predefined pattern, and after that, calculating the signals received from at least one predefined direction. The order exchange between the correlation and the beamforming is possible because multiplication and correlation are linear operations and therefore can be switched between themselves.

There is Identifying and Extracting the Potentially Required Signal.

Whenever the correlation result exceeds a predefined threshold, in a predefined direction, it is likely that a required signal is being received from the appropriate predefined direction, at the detection time (up to some constant processing delay). Therefore, when the correlation result exceeds a predefined threshold, the signal is identified as a potentially required signal.

Alternatively, when using power detection, whenever the power exceeds a predefined threshold, it is likely that a required signal is being received from the appropriate predefined direction. Therefore, when the power detection result exceeds a predefined threshold, the signal is identified as a potentially required signal.

Alternatively, when correlating only one signal received from only one antenna using a predefined correlation pattern, it is likely that a required signal is received by the antenna. Therefore, signals from all directions are identified as potentially required signals. According to this alternative embodiment, the next step is searching for the predefined direction featuring maximum power.

Referring to FIG. 1, device 14 implements single direction beamforming and extracts the identified potentially required signal.

Optionally, there is Recalculating the Identified Potentially Required Signal Received from at Least One Predefined Direction.

In an exemplary embodiment of the present invention, the initial beamforming is calculated using low dynamic range in order to reduce hardware requirements. Low dynamic range may be implemented by short word-length calculation.

Optionally, there is recalculating, using improved dynamic range, the identified potentially required signal received from the at least one predefined direction.

This step is optional because the signal can be forwarded to the modem without an additional calculation featuring improved dynamic range. Hereinafter, the terms improved dynamic range and improved calculation precision have the same meaning.

Referring to FIG. 1, device 14 implements single direction beamforming. In an exemplary embodiment of the present invention, device 14 receives at least two base-band inputs 11 and one angle of arrival 13 of the identified potentially required signal from device 12.

Device 14 is known in the art as delay and sum beamforming. Usually, device 14 is multiplying the received input signal in predefined weightings Referring to FIG. 1, in an exemplary embodiment of the present invention, device 12 and device 14 are implemented in an FPGA.

There is Forwarding the Identified Potentially Required Signal to a Modem.

Modem 15 receives the identified potentially required signal.

As explained above, according to the present invention, all signals that do not have the required characteristics are filtered out before they are forwarded to modem 15. As a result, the number of calculations modem 15 is required to perform is drastically reduced. According to the present invention, modem 15 detects only the identified potentially required signals and does not detect all other received signals.

Figure 2:
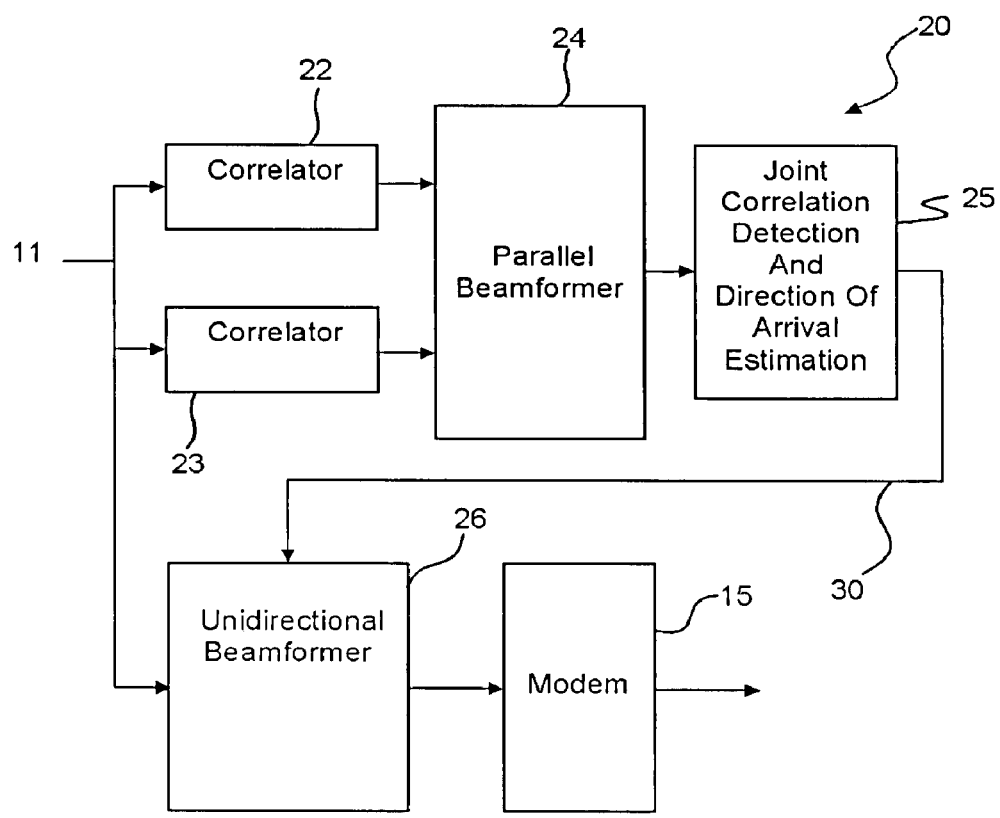
FIG. 2 is a schematic diagram illustrating an alternative exemplary preferred embodiment of the system for joint signal detection

Referring now back to the drawings, FIG. 2 is a schematic illustration of an alternative preferred embodiment of the system of the present invention, generally referred to as system 20, in relation to other objects and features, for joint signal detection and direction of arrival estimation, in accordance with the present invention. System 20 features the following primary components: at least two different correlators (FIG. 2 illustrate only two different correlators, 22 and 23, but it is to be understood that there may be more than two different correlators on each input), parallel beamformer 24, joint correlation detection and direction of arrival estimation 25, unidirectional beamformer 26, and modem 15. Device 25 may also be referred to as a time and space detector. It is to be understood that all the above-described components are only a schematic illustration of the components of the present invention. For example, the components of the present invention may be connected either to each base-band input or to pre-selected inputs, i.e. devices 22, 23, 24, and 25 may be applied to all or some of the base-band inputs 11, moreover, each type of correlator (22, 23) is only a schematic illustration of an array of correlators connected to each one of base-band inputs 11. Moreover, beamformer 24 is only a schematic illustration of a device that separately performs beamforming on each type of correlator inputs. For example, all are beamformed independently of inputs from correlators 23. Each primary component and additional components needed for enabling the use of system 20 are described in the following detailed description of the method of the present invention.

There is Receiving at Least Two Input Signals 11 from an Antenna Array.

The antenna of the present invention is an antenna array featuring at least two elements.

In an exemplary embodiment of the present invention, there is receiving at least two base-band input signals from an antenna's elements. In an exemplary embodiment of the present invention, the elements feature the same weights, for example, a weight equal to one, i.e. no weight.

It is to be understood that the input signals are processed in the digital domain, after down-conversion from RF to base-band frequency, filtering, and sampling by analog to digital device. Referring to FIG. 1, according to an exemplary processing in the digital domain, at least two input signals are receiving at least two base-band inputs 11.

Referring to FIG. 2, according to an exemplary embodiment, at least two input signals are receiving at least two base-band inputs 11 processed in the digital domain.

There is Correlating at Least One Base-Band Input 11 with at Least One Predefined Correlation Pattern.

Referring to FIG. 2, in an exemplary embodiment of the present invention, there are at least two correlators (correlator A 22 and correlator B 23), featuring different predefined patterns, i.e. each correlator identifies a different type of signal.

It is to be understood that each type of correlator (for example correlator A 22 and correlator B 23) is applied to all base-band inputs 11.

Figure 3:
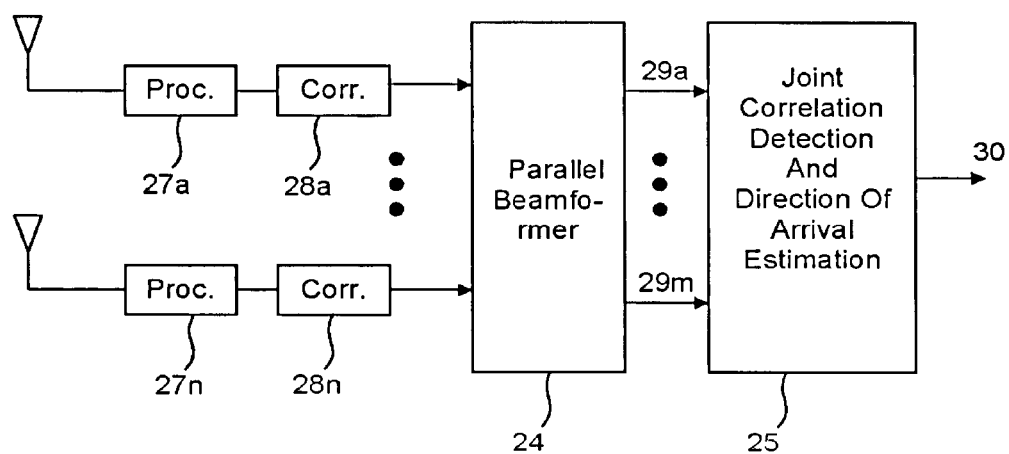
FIG. 3 is a schematic diagram illustrating an alternative exemplary preferred embodiment of a part of the system for joint signal detection and direction of arrival estimation, in accordance with the present invention.

FIG. 3 is an exemplary embodiment of a part of FIG. 2. In FIG. 3 there are 'n' input signals entering parallel beamformer 24. The input signals are preprocessed by 27*a-n* and correlated using the same correlation pattern of each of the correlators 28*a-n*. 'n' may be any number larger than two.

Parallel beamformer 24 outputs 'm' directions 29*a-m* that are entering time and space estimators 25. Time and space estimators 25 output the direction of a potentially required signal 30.

There is Beamforming the Correlated Signals.

Referring to FIG. 2, the beamforming is implemented in device 24. As known in the art, beamformer 24 is extracting the signals received from at least one predefined direction.

In an exemplary embodiment of the present invention, beamforming is achieved by multiplying the received input signals in predefined weightings.

Optionally, the weightings are implemented by using IFFT, as known in the art.

Optionally, the beamforming is achieved by matrix vector multiplication, as known in the art.

In an exemplary embodiment of the present invention, the beamforming to all predefined directions is implemented in parallel.

There is Detecting Correlation and Estimating Direction of Arrival for Identifying the Potentially Required Signal Referring to FIG. 2, joint correlation detection and direction of arrival estimation are implemented in device 25. The purpose of the joint correlation detection and direction of arrival estimation is to identify the direction of arrival of a signal that may feature required information. The signal that may feature required information is forwarded to modem 15. In an exemplary embodiment of the present invention, whenever the calculation results following beamforming are above a predefined threshold, it is most likely that the signal from the appropriate direction is a required signal, and therefore is identified as a potentially required signal.

As disclosed above, in an exemplary embodiment of the present invention, there are at least two correlators (correlator A 22 and correlator B 23), featuring different predefined patterns, i.e. each correlator identifies a different type of signal. All outputs of the at least two correlators are beamformed in parallel. After the beamforming, when a required signal is received, only one correlator should feature the result of a correlation above a predefined threshold.

In an exemplary embodiment of the present invention, the method of the present invention avoids interference by using repetitive detections of the same angle of arrival of an unwanted interfering signal and ignoring all signals received from the direction of that unwanted interfering signal.

There is Extracting the Identified Potentially Required Signal

Referring to FIG. 2, the identified potentially required signal is extracted in beamformer 26.

Optionally, beamformer 26 is unidirectional beamformer. Moreover, beamformer 26 may use a better dynamic range in relation to beamformer 24.

Beamformer 24 is known in the art as delay and sum beamforming. Usually, beamformer 24 is multiplying the received input signal in predefined weightings Referring to FIG. 2, in an exemplary embodiment of the present invention, beamformer 24 and beamformer 26 are implemented in an FPGA.

There is Forwarding the Identified Potentially Required Signal to Modem 15.

As explained above, according to the present invention, signals not having the required characteristics are not forwarded to modem 15. As a result, the number of calculations that modem 15 is required to perform is drastically reduced. According to the present invention, modem 15 is detecting only the identified potentially required signal and none of the other signals received.

Referring to FIG. 2, after identifying the potentially required signal, device 25 is forwarding beamformer 26 the angles of the identified potentially required signal. Beamformer 26 is forwarding the potentially required signal to modem 15.

It is to be understood that the present invention can be implemented with few modems, and thereby handle in parallel multiple signals, as long as the number of detected signals does not exceed the number of available modems.

It is to be understood that FIG. 2 and FIG. 3 are just an exemplary embodiment. Beamformer 26 and beamformer 24 may be the same device. Device 25 may forward beamformer 26 data other than the angles of the potentially required signal, as long as that data enables the system of the present invention to forward modem 15 the required signal.

It will be appreciated that the above-described methods may vary in many ways, such as with changing the order of method steps, and/or performing a plurality of steps concurrently. Moreover, the method of the present invention meaningfully reduces the number of signals the modem must discover. Therefore, the number of calculations is not large, and as a result, it is possible to use a standard modem. Moreover, the modem may also include a single correlator. In principle, it is possible to use this correlator, however, the correlator of the present invention may implement a plurality of correlators that enable both parallel processing and filtering of all irrelevant transmissions and interferences. In fact, the added correlators enable parallel processing in the spatial domain.

The present invention may feature a variety of applications. For obtaining cancellation of dynamic disturbance, there is the need to know the disturbances and the transmitted signals. Moreover, there is the need to have starting and ending conditions. In an exemplary embodiment of the present invention, the system of the present invention provides the direction of arrival of the signal causing the disturbance, as a starting condition for the dynamic disturbance canceling algorithm. This starting condition enables the initialization of, for example, LMS equations, and NULL reduction algorithms such as a generalized sidelobe canceller.

In another exemplary embodiment of the present invention, the present invention determines the desired signal, which is useful for initializing blind nulling algorithms. When a disturbing signal from a certain direction is identified, beamforming is used to place a NULL in the direction causing the disturbance.

Moreover, the present invention is also useful for finding known types of echoes featuring an antenna array, in ultrasound. Moreover, the present invention is useful for sonar searching for a specific signal, wherein the sonar is built from a microphone array. Moreover, the present invention is useful for acoustically pinpointing, using a microphone array to identify the direction from which a sound wave, having a set of required characteristics, arrives.

Thus, it is understood from the embodiments of the invention herein described and illustrated, above, that the methods and corresponding devices for joint signal detection and direction of arrival estimation, based on the ability to identify both the existence and direction of arrival of a required signal featuring known characteristics, of the present invention, are neither anticipated nor obviously derived from the prior art.

It is appreciated that certain features of the invention, which are, for clarity, described in the context of separate embodiments, may also be provided in combination in a single embodiment Conversely, various features of the invention, which are, for brevity, described in the context of a single embodiment, may also be provided separately or in any suitable sub-combination.

It is to be understood that the present invention is not limited in its application to the details of the order or sequence of steps of operation or implementation of the method of the present invention, nor to the details of construction, arrangement, and, composition of the corresponding device thereof, set in the description, drawings, or examples of the present invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and broad scope of the appended claims and their equivalents.

What is claimed is:

1. A method for signals detection comprising:
   (a) receiving at least two input signals from an antenna array,
   (b) extracting signals received from at least one predefined direction,
   (c) checking whether it is likely that a required signal is received by said antenna array,
   (d) identifying and extracting potentially required signal,
   (e) forwarding the identified potentially required signal to a modem.

2. The method of claim 1, wherein said identified potentially required signal is recalculated using a high dynamic range before forwarded to said modem.

3. The method of claim 1, wherein said at least two input signals from said antenna array are pre-processed in the digital domain.

4. The method of claim 1, wherein said extracting signals received from at least one predefined direction comprising beamforming.

5. The method of claim 4, wherein said beamforming comprising multiplying the received input signals in predefined weightings.

6. The method of claim 5, wherein said multiplying the received input signals in predefined weightings is implemented by IFFT or FFT.

7. The method of claim 4, wherein said beamforming is achieved by matrix vector multiplication.

8. The method of claim 4, wherein said beamforming is implemented in parallel to all predefined directions.

9. The method of claim 1, wherein said checking whether it is likely that said required signal is received by said antenna array comprising correlating at least one of the extracted signals received from at least one predefined direction with at least one predefined correlation pattern.

10. The method of claim 9, wherein said at least one predefined correlation pattern is a training sequence or preamble.

11. The method of claim 1, wherein said required signal features a repetitive pattern and said checking whether it is likely that said required signal is received by said antenna array comprising autocorrelating the extracted signals received from at least one predefined direction.

12. The method of claim 1, wherein said checking whether it is likely that said required signal is received by said antenna array comprising detecting the power of at least one of the extracted signals received from at least one predefined direction.

13. The method of claim 1, wherein said checking whether it is likely that said required signal is received by said antenna array comprising spatial detecting of the power of the extracted signals received from at least one predefined direction and correlating the signals featuring power exceeding a predefined threshold with at least one predefined correlation pattern.

14. The method of claim 9, wherein when the correlation result is exceeding a predefined threshold, identifying the strongest extracted signal as said potentially required signal.

15. The method of claim 12, wherein when the detected power exceeds a predefined threshold, identifying said extracted signal as potentially required signal.

16. The method of claim 1, wherein said method is providing direction of arrival of signal causing disturbance as a starting condition for a dynamic disturbance canceling algorithm.

17. The method of claim 1, wherein said method is providing a blind nulling algorithm with the direction of arrival of a desired signal.

18. The method of claim 1, wherein said method is used for interference avoidance by repetitive detections of the same angle of arrival of an unwanted interfering signal and ignoring all signal received from the direction of said unwanted interfering signal.

19. The method of claim 1, wherein said method is used for detecting 802.11 type of signals.

20. A device for joint signal detection and direction of arrival estimation comprising:
(a) an antenna array,
(b) at least one beamformer,
(c) at least one signal characteristics detector for checking whether it is likely that at least one required signal is received by said antenna array,
(d) at least one characteristics identifier, wherein said characteristics identifier is identifying a potentially required signal featuring predefined characteristics,
(e) a controller, wherein said controller is forwarding the identified potentially required signals to a modem.

21. The method of claim 20, wherein said identified potentially required signal is extracted using an improved dynamic range before forwarded to said modem.

22. The device of claim 20, wherein said device is selected from the group consist of receiver and transceiver.

23. The device of claim 20, wherein said at least one beamformer is implemented by IFFT or FFT.

24. The device of claim 20, wherein said at least one beamformer is a parallel beamformer, calculating all predefined directions in parallel.

25. The device of claim 20, wherein said at least one beamformer comprising a first beamformer featuring a predefined dynamic range and a second beamformer featuring an improved dynamic range.

26. The device of claim 25, wherein said first beamformer is a parallel multidirectional beamformer and said second beamformer is a single direction beamformer.

27. The device of claim 20, wherein said at least one signal characteristics detector comprising at least one correlator.

28. The device of claim 20, wherein said at least one signal characteristics detector comprising at least one power detector.

29. The device of claim 20, wherein said at least one signal characteristics detector comprising a spatial power detector and at least one correlator.

30. The device of claim 20, wherein said device is used for detecting 802.11 type of signals.

31. A method for signals detection comprising:
(a) receiving at least two input signals from an antenna array,
(b) correlating said at least two input signals with at least one predefined correlation pattern,
(c) beamforming the correlated signals from each one of said at least one predefined correlation pattern,
(d) correlation detecting and direction of arrival estimating for identifying potentially required signal,
(e) forwarding the identified potentially required signal to a modem.

32. The method of claim 31, wherein said forwarding said identified potentially required signal to a modem comprising extracting said identified potentially required signal.

33. The method of claim 32, wherein said extracting said identified potentially required signal is implemented by using a single direction beamformer.

34. The method of claim 32, wherein said at least two input signals from said antenna array are pre-processed in the digital domain.

35. The method of claim 32, wherein said beamforming is implemented by IFFT or FFT.

36. The method of claim 32, wherein said beamforming is achieved by matrix vector multiplication.

37. The method of claim 32, wherein said beamforming is implemented in parallel to all predefined directions.

38. The method of claim 32, wherein the identification of said potentially required signal is performed by comparing the beamforming results with a predefined threshold.

39. The method of claim 32, wherein said at least two input signals are correlated with at least two predefined correlation pattern and the identified potentially required signal is a signal that only one of the at least two correlators feature a correlation above a predefined threshold.

40. The method of claim 32, wherein said method is providing direction of arrival of desired signal as a starting condition for a dynamic disturbance canceling algorithm.

41. The method of claim 32, wherein said method is providing a blind detection algorithm the direction of arrival of a desired signal and the direction of arrival of a disturbing signal.

42. The method of claim 32, wherein said method is used for detecting 802.11 type of signals.

43. A device for joint signal detection and direction of arrival estimation comprising:
(a) an antenna array,
(b) at least one correlator featuring a predefined pattern,
(c) at least one beamformer,
(d) at least one signal characteristics detector for checking whether it is likely that at least one required signal is received by said antenna array,
(e) at least one characteristics identifier, wherein said characteristics identifier is identifying potentially required signal featuring predefined characteristics,
(f) at least one controller, wherein said at least one controller is forwarding the identified potentially required signal to a modem.

44. The device of claim 43, wherein said identified potentially required signal is extracted using an improved dynamic range before forwarded to said modem.

45. The device of claim 44, wherein said identified potentially required signal is extracted using a single direction beamformer.

46. The device of claim 43, wherein said device is selected from the group consist of receiver and transceiver.

47. The device of claim 43, wherein said at least one beamformer is implemented by IFFT or FFT.

48. The device of claim 43, wherein said at least one beamformer is a parallel beamformer, calculating all predefined directions in parallel.

49. The device of claim 43, wherein said device comprising at least two correlators featuring a predefined pattern and all calculations on the results of said at least two correlators are performed in parallel.

50. The device of claim 43, wherein said at least one beamformer comprising a first beamformer featuring predefined dynamic range and a second beamformer featuring an improved dynamic range.

51. The device of claim 43, wherein said device is used for detecting 802.11 type of signals.

* * * * *